(No Model.)

J. HARRISON.
ADJUSTABLE SPANNER FOR CYCLISTS, &c.

No. 581,823. Patented May 4, 1897.

Witnesses.
R. M. Elliott
Geo. M. Copenhaver

John Harrison
Inventor
By John J. Halsted & Son
his Attys

THE NORRIS PETERS CO., PHOTO-LITHO., WASHINGTON, D. C.

United States Patent Office.

JOHN HARRISON, OF PETERBOROUGH, ENGLAND, ASSIGNOR TO THE ELLIPTIC CYCLE COMPANY, OF SAME PLACE.

ADJUSTABLE SPANNER FOR CYCLISTS, &c.

SPECIFICATION forming part of Letters Patent No. 581,823, dated May 4, 1897.

Application filed September 14, 1896. Serial No. 605,844. (No model.)

*To all whom it may concern:*

Be it known that I, JOHN HARRISON, a subject of the Queen of Great Britain, residing at Peterborough, England, have invented new and useful Improvements in Adjustable Spanners for Cyclists and Others, of which the following is a specification.

This invention relates to that class of adjustable spanners which have a pair of jaws at each end and a worm or screw for adjusting both pairs of jaws simultaneously.

According to my invention I not only make the spanner in two straight parts or bars, the ends of each bar or half forming the inner jaw of one pair of jaws, and with the said ends so shaped and arranged that when one pair is quite closed the other pair is more or less open, but I make one end of each bar with a strong curved or bent portion, this curved part extending outward from the bar a distance about equal to the breadth of the main body of the bar, and on the opposite or inner side of this curved part is formed a deep recess or cavity.

The two halves carrying the ends forming the jaws slide one upon the other and are held together by clips or stirrups, one clip preferably being fixed to each part and embracing the other part. One part is recessed and carries a screw or worm which engages with teeth on the other part. The worm is carried upon a spindle which is flattened at its ends to enter slots and then riveted or burred over to fix it in position.

Figure 1:
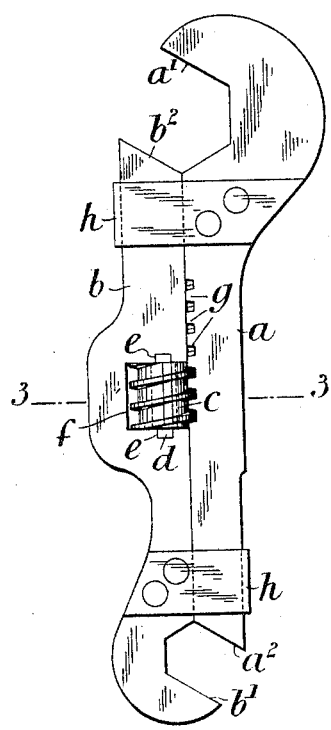
Figure 2:
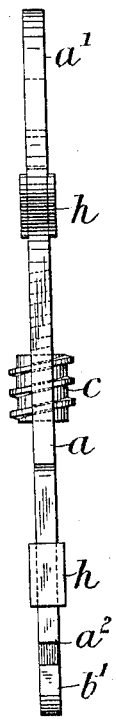
Figure 3:
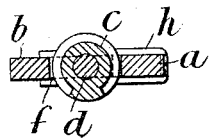

In the accompanying drawings, Figure 1 is a side elevation of a spanner made according to my invention. Fig. 2 is an elevation at right angles to Fig. 1, and Fig. 3 is a section on the line 3 3, Fig. 1.

$a$ and $b$ are the two parts or halves of the spanner, the said parts or halves being, as shown in Fig. 2, each made of a thin metal bar of equal thickness throughout, thus not only facilitating construction, inasmuch as they can be stamped out of plate metal, but also materially reducing the weight, as the metal is used in the best manner to withstand working strain, arranged so that at one end they form the outer jaws $a'$ and $b'$ of the two pairs of jaws, the other ends $a^2$ and $b^2$ being arranged to form the inner jaws. The jaw $a'$ is made to fit a larger nut than the jaw $b'$.

The ends having the jaws $a' b'$, respectively, are made very deep and strong and are preferably shaped to have three interior faces, as shown, thus not only allowing a nut to be inserted deeply between the faces $a' b^2$ or $b' a^2$ to insure a good purchase or hold on two opposite sides of a nut, but also allowing the angle of a polygonal nut to project into the angle formed by the other two faces.

$c$ is the worm or screw with which the half or part $b$ is provided, the said worm being mounted loosely upon a spindle $d$, which is flattened at its ends to enter slots $e e$ in a recess $f$ in the half $b$ and is then riveted or burred over to fix it in position, as described.

$g g$ are the teeth formed in the half or part $a$ and with which the worm or screw $c$ engages.

$h h$ are the clips or stirrups, riveted to one end of each of the halves and in which the other ends of the said halves slide when the worm $c$ is turned.

The recess or cavity in each curved end $i$ is shown at $j j' j^2$, Fig. 1, and it presents three surfaces to receive and hold a nut, and it will be observed that neither the inner nor the outer jaws are upturned or bent to project outward and that the straight backs of $a$ or $b$ respectively meet the inclined end faces of the jaws $a^2$ and $b^2$ at an acute angle. When the spanner is closed as far as the screw will permit, the implement is very compact and may be conveniently carried in one's pocket and the recess $i$ is below the line of contact of the two bars.

With this construction of spanner it will be obvious that, by rotating the worm, the ends forming the jaws will be caused to approach or recede from one another according to the direction in which the worm is turned, whereby they will be adapted for different-sized nuts, and it will also be obvious that one end of the spanner will always be arranged to receive larger nuts than the other end.

I make no claim, broadly, to a spanner having straight bars of different lengths and jaws at both ends nor to one having a worm-screw in one bar for actuating the other bar; but

What I claim as my invention, and desire to secure by Letters Patent, is—

In a double spanner having two bars with straight contacting edges, held together by clips and provided with a worm-screw for moving one bar on the other, a spindle on which the worm-screw is loosely mounted, the ends of such spindle being flattened and fitted into two narrow slots in one of the bars, and then secured there by having such ends riveted or burred over upon the bar, as set forth.

JOHN HARRISON.

Witnesses:
 ARTHUR HILL,
 WALTER BOYER.